Sept. 14, 1954    M. A. POWERS    2,689,048
REFILLABLE FILTER
Filed Jan. 11, 1950
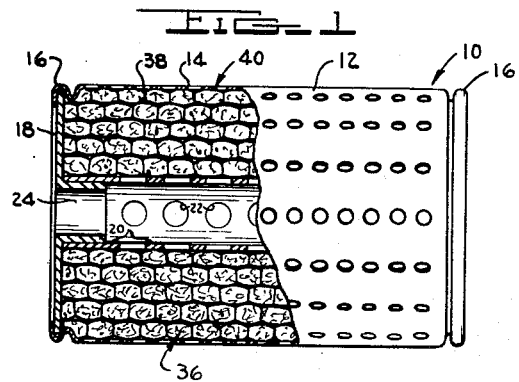
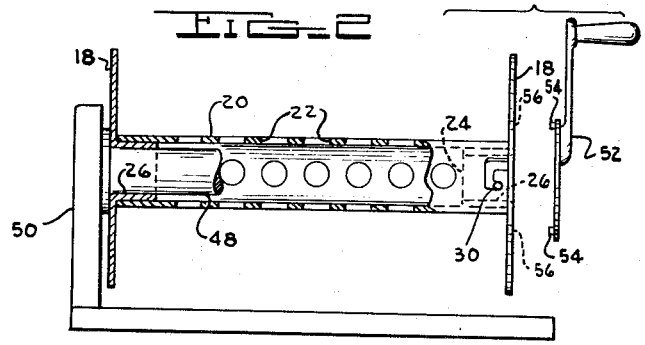
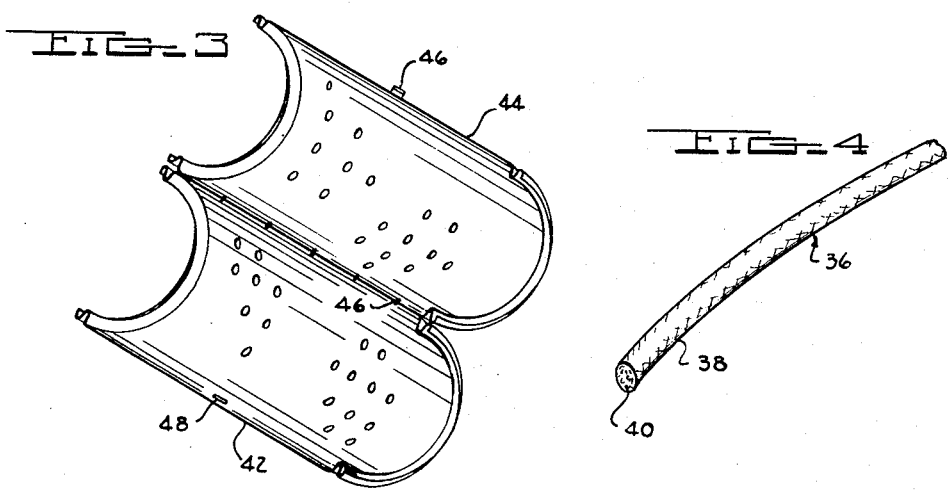
INVENTOR.
MILTON A. POWERS
BY
ATTORNEY

UNITED STATES PATENT OFFICE 2,689,048

REFILLABLE FILTER

Milton A. Powers, Detroit, Mich.

Application January 11, 1950, Serial No. 137,969

1 Claim. (Cl. 210—148)

The present invention relates to oil filtering cartridges, and more particulraly to oil filtering cartridges for use in connection with the oil supply system for internal combustion engines and in which the filter element can be renewed therein in a most economical manner by the operator of the internal combustion engine.

As is well known, it is necessary that oil filtering units be used in the lubricating oil system of internal combustion engines to remove particles of metal, carbon, grit and other impurities that may be picked up by the lubricating oil as it is pumped through the lubricating oil system. Also, in many types of diesel engines, oil filtering units are employed for filtering the diesel fuel oil so that this oil will be free of impurities prior to being passed to the injectors of the engine. The filter elements of the filtering units, in either the lubricating oil or fuel oil systems of internal combustion engines are designed to be renewable so that after a certain amount of impurities has been absorbed by the filtering elements they can be replaced with clean filter elements.

It is found that the cost of renewing the filter elements, particularly in diesel engines, is considerable. It is recognized that this cost can be reduced appreciably if the operators in the field are able to assemble a filter element from relatively cheap filter materials and use it as a replacement for the expended filter element. However, if such a practice is to be carried out, it is necessary that the operator in the field be supplied with an inexpensive filter material in suitable form to be easily assembled into a filter cartridge casing, and also that the internal combustion engines which he is operating be equipped with a filter cartridge casing adapted for receiving such inexpensive filter materials. Further, it is essential that the filter material be in a suitable form so that any operator, unskilled in assembling filtering units, may assemble the filter element in the filter cartridge casing to provide the optimum filtering qualities without having any undesirable results such as channeling of the filter material, or the like.

Accordingly, it is an object of the present invention to provide a filter cartridge for use in internal combustion engines which can be easily disassembled by an unskilled worker in the field into its component parts to permit the filter element to be removed from the cartridge casing and replaced by an unused filter element.

It is a further object of the present invention to provide a relatively inexpensive filter element adapted to be easily assembled into a filter cartridge casing by an unskilled worker in the field and which when assembled will give optimum filtering characteristics.

Other objects of this invention will appear in the following description and appended claims, reference being had to the accompanying drawings forming a part of this specification wherein like reference characters designate corresponding parts in the several views.

Fig. 1 is a longitudinal view partly in section of one form of the present invention showing a filter cartridge casing filled with a filter element.

Fig. 2 is a longitudinal view partly in section showing the spool of the present invention mounted on a supporting structure used in assembling a filter element thereon and a crank for turning said spool during the assembling operation.

Fig. 3 is a perspective view of the outer shell of the filter cartridge casing in its open position.

Fig. 4 is a perspective view of a portion of the filter element used in the present invention.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Before defining specifically the structure of the present invention a general description thereof will be made to provide a better understanding of the invention. The oil filter cartridge has a spool structure about which the filter element can be wound and a cylindrical shell which encloses the open side of the spool. The cylindrical shell is constructed so that it may be easily removed from the spool to provide access to the filter element wound on the spool. One end of the spool is detachable so that after the cylindrical shell has been removed said one end can be detached, the expended filter element discharged, said one end reattached, and a new filter element wound on the spool.

The filter element of the present invention has a rope-like shape and is quite flexible so that it may be easily wound on the spool. It comprises a cotton web tubing member which is filled with any suitable type of relatively inexpensive filtering material to form a continuous rope-like filtering element.

It is found that the present filter element, when wound on the spool of the filter cartridge, provides an exceptionally good oil filter which will thoroughly remove the grit, metal particles, and the like, from the oil while at the same time it will withstand the tendencies of the oil to channel through the filter material. This latter highly desirable characteristic of the wound filter element is obtained because the wound filter element has a multitude of porous internal walls of cotton web tubing, formed as a result of the plurality of windings of the filter element, and these internal walls maintain the filter material uniformly dispersed throughout the filter cartridge. Thus, the filter material is held in its initially wound position and is prevented from becoming channeled by the flowing oil.

No high degree of skill is required to wind the present filter element. It is spooled in a snug manner on the spool of the filter cartridge, and this operation can be performed by the operator of the internal combustion engine. Thus, it is seen that an easily assembled filter unit is provided which is both economical to produce and highly efficient in use.

Reference is now made to the drawings for a more detailed description of the present invention. The filter cartridge 10 is shown having an outer cylindrical shell 12 having a plurality of apertures 14 therein providing inlets for the oil to enter the oil filter cartridge 10. Each end of the outer cylindrical shell 12 has an inwardly opening channel flange 16 adapted to receive annular discs 18 which form the respective ends of the oil filter cartridge 10. Extending between annular discs 18 and radially inwardly of the outer cylindrical shell 12 is an inner cylindrical shell 20 having a plurality of apertures 22 through which the oil is discharged from the oil filter cartridge 10. The annular discs 18 have hubs 24 on which the inner cylindrical shell is supported to form a spool structure. These discs 18 have axial openings 26 through which the filtered oil is discharged from the oil filtering unit.

In the form of the invention shown, one of the annular discs 18 is secured to the inner cylindrical shell 20 by any suitable means while the other disc 18 is slidably fitted on the hub 24 thereof and is locked in place by the catch 30.

A filter element 36 is fitted within the chamber formed by the inner and outer cylindrical shells 20 and 12, respectively, and annular discs 18. The filter element 36 is made of a relatively light cotton web tubing 38 and filter material 40 which fills the cotton web tubing 38 and acts to filter the oil passing therethrough.

The outer cylindrical shell 12 is longitudinally split forming two sections 42 and 44 which are hingedly joined by a plurality of wire coil hinges 46 so that the outer cylindrical shell 12 may be swung open about the hinges 46 and removed from the remainder of the filter cartridge 10 to provide access to the filter element 36 contained therein. A locking member is also provided on the cylindrical shell 12 for locking the sections 42 and 44 together in a closed position and includes the clasp 46 and the indented portion 48.

Thus, it can be seen that an oil filter cartridge 10 has been provided wherein the outer cylindrical shell 12 and one of the annular discs 18 can be removed to permit the expended filter element to be removed and after replacing the annular disc 18 in its proper place, a new filter element can be wound thereon and the outer cylindrical shell 12 replaced.

Referring to Fig. 2; in order to wind the filter element 36 on the inner cylindrical shell 20, any suitable supported shaft 48 mounted on an upright 50 may be utilized together with a crank 52 having lugs 54 adapted to fit into holes 56 of annular disc 18. The spool of the oil filter cartridge 10 is placed on the shaft 48 as shown in Fig. 2 and a filter element fed thereto as the spool is rotated by the crank 52. The filter element is wound on the spool in layers until all the space between the end discs 18 is filled. After this spooling operation is completed the cylindrical shell 12 is replaced and the filter cartridge is ready for further use.

Other devices than the shaft 48, upright 50 and crank 52 may be used for winding the filter element on the spool, as will be readily apparent to persons skilled in the art. For example, the crank may extend through the upright 50, from the left as seen in Figure 1, and be journaled therein to provide a shaft for rotating the spool. This type of construction will dispense with the problem of having a loose crank which might be misplaced.

While an oil filter cartridge has been shown and described having a removable shell 12 and a removable annular disc 18 at one end of the spool for removing an expended filter element and replacing it with a new one, it should be understood that a one piece spool may be used for reasons of economy. If this construction is employed the expended filter element can be removed from the spool by an unwinding action.

Further, it should be understood that the shell 12 may be eliminated completely if desired. In this event, when the last winding of the filter element has been made the outer end must be tucked under the preceding winding of the filter element to hold the outer end in place during use. This provides an additional advantage of the present filter element since it will retain its shape and filtering properties while permitting the cost of the casing for the filter element to be reduced.

Having thus described my invention, I claim:

An oil filter cartridge comprising inner and outer perforated cylindrical shell members spaced apart radially to form a filter element chamber, annular discs operatively secured to the ends of said perforated cylindrical shell members for closing the open ends of said chamber, said outer cylindrical shell member being split longitudinally and having connecting members along the split edges to permit removal of such shell member from said annular discs, an elongated one piece filter element spooled on the inner cylindrical shell member in a plurality of rows and layers for filtering oil, said filter element including a flexible porous tubing and a filter material filling said flexible tubing, one of said annular discs being attached to said inner cylinder by a quick release mechanism to permit removal of said one disc from said inner perforated cylindrical shell member for discharging the filter element from said chamber, and crank means for spooling a new filter element on said inner cylindrical shell member after the removed annular disc has been replaced.

References Cited in the file of this patent

UNITED STATES PATENTS

| Number | Name | Date |
| --- | --- | --- |
| 148,288 | Edgar | Mar. 10, 1874 |
| 559,440 | Conrader | May 5, 1896 |
| 1,693,741 | Wuest | Dec. 4, 1928 |
| 1,941,982 | Gill | Jan. 2, 1934 |
| 2,064,511 | Wells | Dec. 15, 1936 |
| 2,218,339 | Manning | Oct. 15, 1940 |
| 2,250,672 | Keefer | July 29, 1941 |
| 2,321,985 | Briggs | June 15, 1943 |
| 2,354,931 | Tolman | Aug. 1, 1944 |
| 2,375,765 | Briggs | May 15, 1945 |
| 2,429,321 | La Brecque | Oct. 21, 1947 |
| 2,463,954 | Decker | Mar. 8, 1949 |
| 2,511,800 | Wilkinson | June 13, 1950 |

FOREIGN PATENTS

| Number | Country | Date |
| --- | --- | --- |
| 530,116 | Great Britain | Dec. 5, 1940 |
| 875,941 | France | Oct. 8, 1942 |